L. LANGHAAR.
BALL BEARING.
APPLICATION FILED JAN. 27, 1909.
981,577.
Patented Jan. 10, 1911.
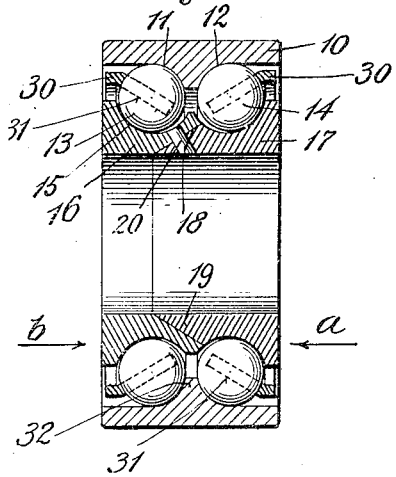
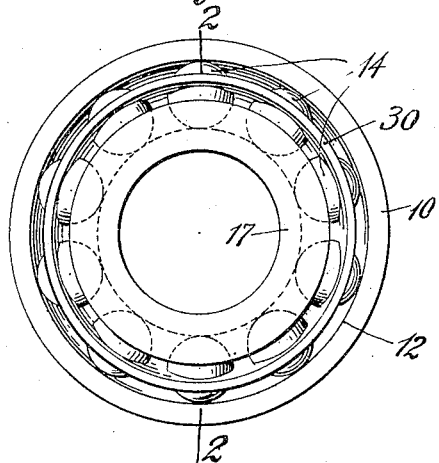
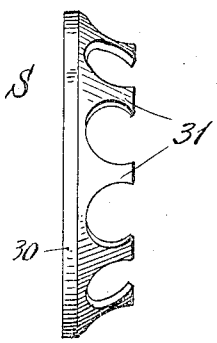
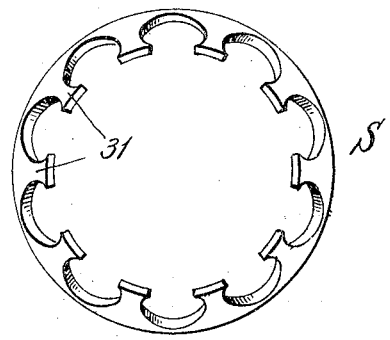
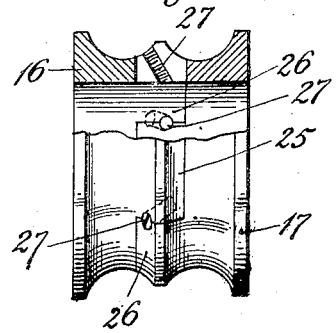
WITNESSES:
INVENTOR.
L. Langhaar,
BY
ATTORNEY.

UNITED STATES PATENT OFFICE.

LOUIS LANGHAAR, OF BRISTOL, CONNECTICUT.

BALL-BEARING.

981,577.

Specification of Letters Patent. Patented Jan. 10, 1911.

Application filed January 27, 1909. Serial No. 474,362.

*To all whom it may concern:*

Be it known that I, LOUIS LANGHAAR, a citizen of the United States, and resident of Bristol, in the county of Hartford and State of Connecticut, have invented certain new and useful Improvements in Ball-Bearings, of which the following is a full, clear, and exact specification.

This invention relates to ball-bearings, and has for its object the provision of a radial and thrust bearing which is equally efficient in all directions and the several parts of which are correctly disposed and thus held relatively to each other so as to constitute a bearing of what is generally called the "unitary" type.

Briefly stated, the bearing comprises an outer race-ring in which two ball-races are formed so that the balls thereof will be opposed to each other; while the inner or central cone is made in two parts which are inserted from the outside of the ring, respectively, and are then held together so as to corotate after the manner of a unitary structure.

The bearing shown in the accompanying drawings is of the "silent" type and comprises one separator for each row of balls, but it should be understood that the invention is not confined to this feature since the bearing may also be of what is generally known as the "full" type.

Another object of the present invention resides in the organization of the two rows of balls in the ball-races in such a manner that any longitudinal thrust which may be exerted upon any of the members, will be directly transferred through the one set of balls on to the other member of the race so that no tendency will exist to spread these members.

Referring to the accompanying drawings in which similar characters denote similar parts Figure 1 represents a side view of the ball-bearing embodying my invention. Fig. 2 is a central longitudinal section thereof on line 2, 2 of Fig. 1. Fig. 3 is a side view of the separator whereby the balls of one row are spaced apart. Fig. 4 is an edge view of the same, and Fig. 5 is a detail view of the central cone illustrating a modification.

In the drawings, the numeral 10 denotes the outer ring of the bearing having a pair of races 11, 12, respectively, for the reception of rows of balls 13 and 14, the balls 13 being interposed between the race 11 and a race-way 15 provided in the central cone which is in the present instance composed of two parts or sections indicated by 16 and 17, respectively. These two cone sections may be secured together in any desired form, the construction shown in Fig. 2 illustrating the cone-section 16 provided with a conical recess 18 adapted to receive a correspondingly shaped projection 19 of the coöperative cone section 17, both parts being held together for corotation as well as against separating movement longitudinally by one or more key members shown herein as pins 20 as will be readily understood. It will, therefore, be seen that any longitudinal thrust brought to bear upon the cone-section 17 in the direction of arrow *a* will be taken up by the row of balls 14 and transferred on to the race 12 of the ring 10 without in any way tending to spread the two rows of balls, and a thrust exerted upon the cone-section 16 in the direction of arrow *b* of Fig. 2 will be transferred through the balls 13 on to the race 11 of the ring 10 without any tendency of affecting the balls of the adjacent row. Likewise it will be seen that any thrust exerted upon the race-ring 10 longitudinally will be directly transferred onto either one or the other of the respective cone-sections 16 or 17 so that all tendency of spreading is entirely avoided. In a similar manner a radial or supporting thrust exerted upon either the race-ring or the cone sections will be fully taken care of without any tendency of spreading.

As above stated my invention comprises as one of its features one separator which distinctly pertains to each row of balls and which is entirely independent of the separator pertaining to the other row for the particular purpose of preventing any drag or grinding of the balls in the races as will, for instance, take place if the two separators are united or made integral and when at the same time the least variation should exist either in the outside diameters of the supporting cone-races, or in the diameters of the two rows of the balls, or in the inside diameters of the races in the outer supporting-ring. If it should for instance be supposed that the outside diameters of the cone-race 15 were only one thousandth of an inch smaller than that of the cone-section 17 and the balls are all exactly alike in both rows, it is self evident that when these balls roll around in their respective cone-races, the balls 13 will naturally "creep ahead" of the balls 14 so that as a matter of course a grinding action will take place between the balls and the separators provided the latter are made in one piece. On the other hand, it will be also clear that, by virtue of making the separators independent of each other, each row of balls can travel at its own speed without in any way being influenced by the other or by the separator carried thereby, and it is this particular feature which I desire more especially to emphasize. The same trouble, of course, would exist if the sets of balls would be of different diameters no matter how small, and the same objection would result if the races in the race-ring 10 should be in any way different; and it should be remembered that when the diameters of the races are concerned a difference of only one thousandth of an inch will make a difference in the circumferential rolling movement of the balls of over three thousandths of an inch for each revolution of the balls around the axis of the bearing, so that the grinding action resulting from the use of a unitary separator in connection with a two race bearing is not by any means a small factor.

The manner of assembling the bearings shown in Fig. 2 is a comparatively easy one, inasmuch as each row of balls can be readily inserted in the race-ring 10 preparatory to the insertion of the cone pertaining thereto; and, in order to make the bearing when assembled a self contained device complete in all its details, all that will be necessary is: to provide some means whereby the two cone-sections 16 and 17 will be held together longitudinally, this object being attained by the pin 20 above referred to.

In Fig. 5 I have illustrated a modification of the cone-sections 16 and 17 which are for instance provided with interlocking cheeks 25, 26 to insure corotation, and which, furthermore, are provided with holding-screws 27 which enter each pair of adjacent abutments so as to serve as keys to prevent the cone-sections from pulling apart, the keys being exposed to the shearing stress, while the screw threads merely serve to keep the screws in place and without receiving any force to resist the separation of the cone-sections.

The separators which are indicated in the drawing by S comprise a continuous annular member 30 from which the ball supporting members 31 project substantially in alinement with the rolling axis of the balls as controlled by the formation of the races belonging thereto; hence it will be seen that the adjacent sections 31 of the two separators or ball retainers will be inclined toward each other, as clearly indicated in Fig. 2. It will also be understood that inasmuch as the ball engaging portions of the separators S follow the curvature of the balls beyond the diametral line, any endwise or rather longitudinal movement of these retainers will be prevented, while, on the other hand, each retainer is fully supported in a floating condition by the balls engaged thereby.

It will be observed that the ball-races 11 and 12 in the ring 10 are separated from each other by an annular ridge 32 which naturally limits the movement of the two sets of balls toward each other, and that the outward portions of the ring 10 have straight ways which permit the ready insertion of the balls when assembled on their respective cones.

Inasmuch as the cones, or more particularly speaking, the outer flanges thereof are of such diameter as to permit the balls in each race to have the required contact with said cones, an annular space is established between the outer diameter of the cones and the inner surface of the ends of the race-ring 10, this space permitting the ready assembling of the parts, as above described. Inasmuch as the two cone-sections abut against each other, it is evident that when these sections are forced together under longitudinal load, no variation in the distance between the ball-races can result; and, again, when a radial load is exerted upon the bearing, the fact that the cone-sections are coupled together against separation by the pins or screws 27 shown in Fig. 5, will offer a strong resistance against spreading action of the cones, which resistance may furthermore be augmented by locking devices on the shaft as usual in common practice.

From a practical standpoint, the construction shown in Fig. 5 is preferable over that shown in Fig. 2, inasmuch as in the former instance the pin 27 serves as a shearing key for its entire length; while in Fig. 2 the shearing resistance of the pin 20 is substantially only that of the cross-sectional area thereof.

I claim:

1. As a new article of manufacture, a ball-bearing comprising a pair of coöperative members, one of said members being unitary and having a pair of adjacent independent raceways, sets of balls in said raceways respectively, the other one of said members consisting of a pair of sections, each section having a raceway and abutting with its extreme inner end against the extreme inner end of the other section at a point between said raceways, and a key-member transversely engaging the abutting ends of both sections and firmly holding the same together.

2. As a new article of manufacture, a ball-bearing comprising a unitary race-ring having a pair of opposed races, an annulus comprising a pair of normally-free and independent cone-sections firmly abutting with their innermost ends, and having raceways coöperative with said races respectively, and a key-member seated in and locking both abutting ends of said cone-sections for corotation and against longitudinal displacement relative to each other.

3. As a new article of manufacture, a ball-bearing comprising a member consisting of a pair of abutting sections each having a raceway and both having jaws for interlocking said abutting ends for corotation, a device engaging the adjacent longitudinal faces of a pair of such interlocking jaws for holding the same against separation longitudinally, a unitary annulus having raceways coöperative with the raceways of said sections, and independent sets of balls in said raceways respectively.

4. As a new article of manufacture, a ball-bearing comprising a unitary annulus having outwardly-opposed raceways, and balls in said raceways respectively, a member having inwardly-opposed raceways for said balls and consisting of a pair of longitudinally-separable sections having their adjacent ends firmly abutting, and means for locking said sections against longitudinal separation, and interlocking jaws on said abutting sections to lock the same for simultaneous corotation.

5. As a new article of manufacture, a ball-bearing comprising a race-ring having a pair of adjacent raceways, independent sets of balls in said raceways, an annulus coöperative with said race-ring and composed of a pair of normally-separate adjacent sections interlocked for corotation, and a key-device seated in the interlocking portions of said sections for positively holding said sections against longitudinal movement relative to each other.

6. As a new article of manufacture, a ball-bearing comprising a race-ring having a pair of adjacent raceways, independent sets of balls in said raceways, an annulus consisting of a pair of corotative abutting sections, and independent means transversely-seated in the adjacent ends of said sections and firmly holding both of the said sections against separation longitudinally of their axis.

7. As a new article of manufacture, a self-contained ball-bearing consisting of an unitary outer annulus having a pair of closely-adjacent parallel raceways, and an inner member coöperative with the outer member and formed of two adjacent tubular sections firmly abutting with their innermost ends against each other and having their inner tubular surfaces in longitudinal alinement with each other, each section having an outer peripheral raceway coöperative with one of the raceways of the outer member respectively, sets of balls in said raceways respectively, and an independent key-device disposed between said raceways and passing through both of the abutting ends of said sections for firmly holding the same against separation.

8. As a new article of manufacture, a self-contained ball-bearing comprising a unitary annulus having a pair of adjacent races, a sectional bearing-member consisting of two sections, each of which has a raceway, and also a supporting surface concentric therewith, both of such supporting surfaces being disposed in longitudinal alinement with each other, balls in said races and raceways, a transversely-disposed key-device seated in both of the abutting ends of said sections and for firmly holding the same in a predetermined fixed position relative to each other.

9. As a new article of manufacture, a self-contained ball-bearing consisting of a unitary annulus having a pair of closely-adjacent parallel raceways, and another member coöperative with the first member and formed of two adjacent sections firmly abutting with their innermost ends against each other, each section having a parallel raceway coöperative with one of the raceways of the other member respectively, sets of balls in said raceways respectively, and an independent key-device disposed between said raceways and passing through both of the abutting ends of said sections for firmly holding the same against separation.

10. As a new article of manufacture, a self-contained ball-bearing consisting of a unitary annulus having a pair of closely-adjacent parallel raceways, and another member coöperative with the annulus and formed of two adjacent sections firmly abutting with their innermost ends against each other, and having their innermost ends overlapping each other longitudinally, each section having a raceway coöperative with one of the raceways of the annulus respectively, sets of balls in the raceways respectively, and an independent key-device disposed between said raceways and passing through both the overlapping extreme parts of the abutting ends for firmly holding said sections against separation.

11. As a new article of manufacture, a self-contained ball-bearing consisting of a unitary annulus having a pair of adjacent parallel raceways, and another member coöperative with said annulus and formed of two normally-separate alined sections having their adjacent ends overlapping each other longitudinally, and each section having a raceway coöperative with one of the raceways of the annulus respectively, sets of balls in the raceways respectively, and an independent device seated in both of said sections within the overlap confines for respectively holding said sections against longitudinal movement relative to each other.

12. As a new article of manufacture, a self-contained composite ball-bearing comprising a unitary race-ring having a pair of opposed races, another bearing member consisting of a pair of sections having opposed raceways coöperative with the races of said race-ring, a single device for holding said sections against longitudinal separation, the ends of one of said bearing members terminating substantially in the same plane with the corresponding ends of the other bearing member, sets of balls in said raceways respectively, and separators for said sets of balls respectively, each separator consisting of a recessed annulus for receiving the balls of its own set and comprising an annular flange terminating substantially in the same end-plane as the bearing members.

LOUIS LANGHAAR.

Witnesses:
CHAS. F. SCHMELZ,
MARGARET E. O'NEILL.